April 15, 1941.　　　　V. DAHLMAN　　　　2,238,251
AIR FILTER LOADER
Filed Jan. 31, 1940　　　3 Sheets-Sheet 1

Verner Dahlman
Inventor
by Arthur J. Robert
Attorney

April 15, 1941.   V. DAHLMAN   2,238,251
AIR FILTER LOADER
Filed Jan. 31, 1940   3 Sheets-Sheet 2

VERNER DAHLMAN
INVENTOR
by Arthur J. Robert
ATTORNEY

April 15, 1941.                     V. DAHLMAN                    2,238,251
                                 AIR FILTER LOADER
                              Filed Jan. 31, 1940          3 Sheets-Sheet 3
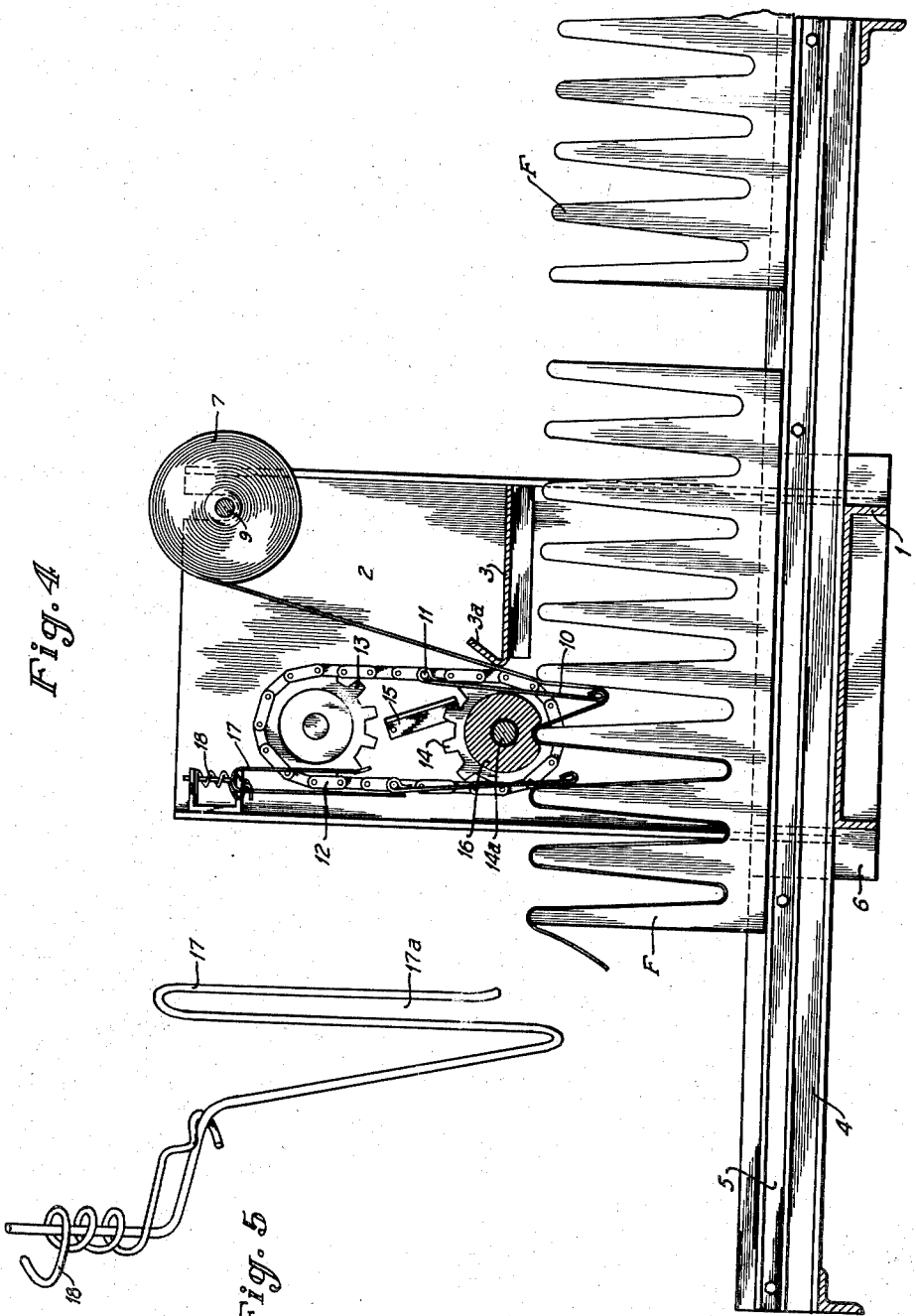
Verner Dahlman — Inventor,
by Arthur J. Robert
Attorney Patented Apr. 15, 1941

2,238,251

UNITED STATES PATENT OFFICE 2,238,251

AIR FILTER LOADER

Verner Dahlman, Louisville, Ky., assignor to American Air Filter Company, Inc., Louisville, Ky., a corporation of Delaware Application January 31, 1940, Serial No. 316,597

9 Claims. (Cl. 93—1)

The Nutting application Serial No. 116,318 filed December 17, 1936, which issued as Patent No. 2,211,382 on August 13, 1940, discloses an air filter unit composed of a removably securable pair of unitary open-ended upstream and downstream frames which are arranged to clamp an interposed air filter medium, the downstream frame presenting a corrugated filter medium support to which an interposed medium is conformed and upon which it is supported against the force of the air flow. The Hughes application, Serial No. 135,100, filed April 5, 1937, which issued as Patent No. 2,188,572 on January 30, 1940, discloses and claims a loader, for air filters of the type having a corrugated filter medium support, comprising: a frame having a loading area through which said support passes, during the loading operation, with the crests and valleys of its corrugations in sequential relation; and a series of relatively movable operating elements mounted on the frame for prescribed sequential movement such that one element engages one portion of a filter medium, interposed between it and the support, presses it into, and then holds it in, substantially full conformation with one valley of the support until the next element engages and presses the next portion of the filter medium into substantially full conformation with the next valley. The present invention is directed to a modified form of loader.

The principal object is to provide a simpler form of loader which is correspondingly less expensive to manufacture.

Another object is to provide a loader in which the means for holding the filter medium in conformation with one valley is independent of the means for conforming the filter medium to that valley whereby the mechanism prescribing the path of travel for the conforming means may be greatly simplified.

When a filter medium composed of glass fibers is conformed to a corrugated medium support by rod-like conforming elements, the fibers have a tendency to wrap around the rods; consequently, the rods pull the entangling fibers away from the medium, as they move relatively to the medium, and thus occasion damage. Another object of the invention, therefore, is to avoid this action by providing conforming elements in the form of blades or paddles about which the fibers cannot become entangled.

The invention is illustrated in the accompanying drawings, wherein:

Figure 4 is a section taken along line 4—4 of Figure 1 with a partially loaded corrugated filter medium support shown in elevation and with the conveyor chains moved substantially from the position shown in Figure 1; and Figure 5 is a perspective view of the arm and spring elements of the swing limiting means.

Figure 1:
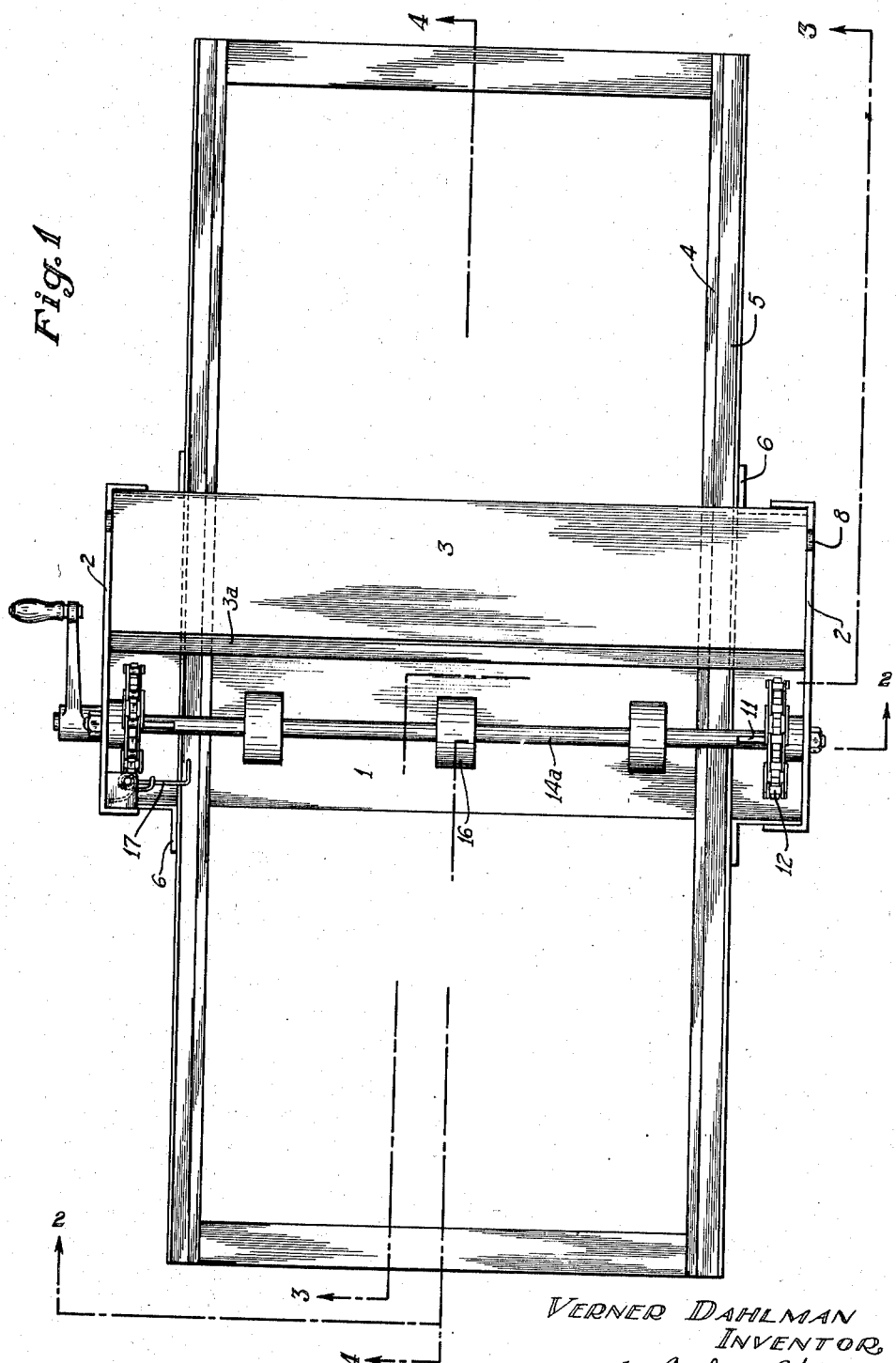
Figure 1 is a top plan view of a loader embodying the invention.
Figure 2:
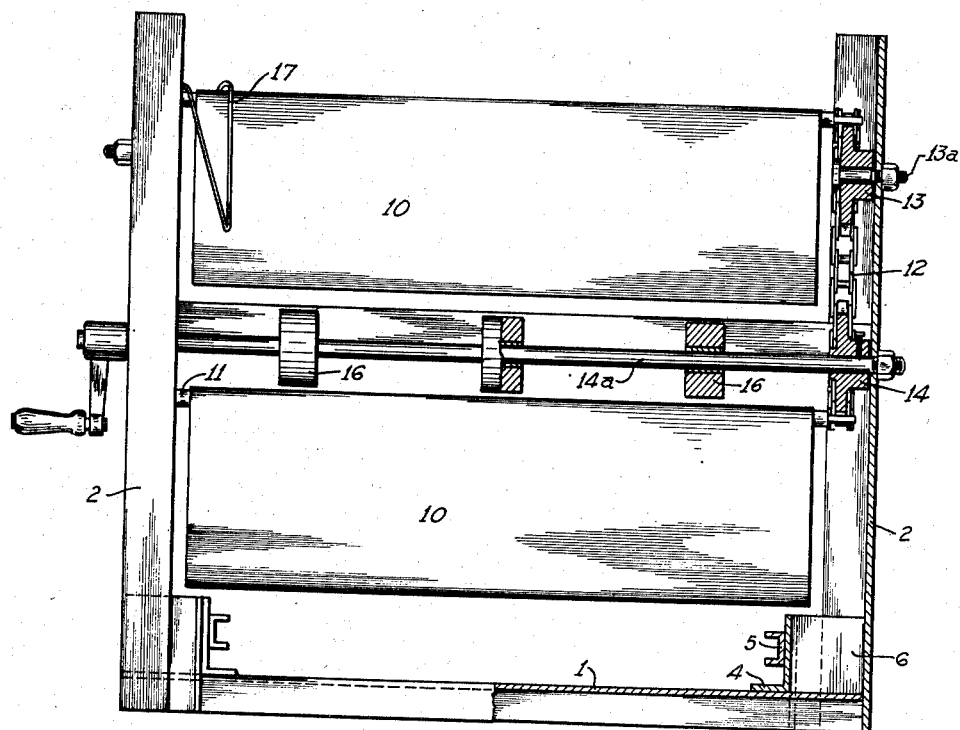
Figure 2 is a section taken along line 2—2 of Figure 1.
Figure 3:
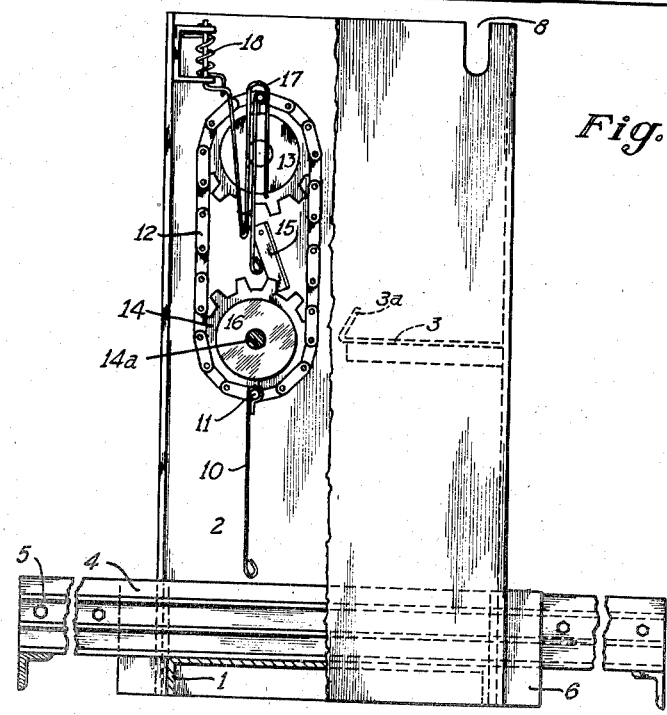
Figure 3 is a section taken along line 3—3 of Figure 1.

The illustrated embodiment of the invention conventionally includes: a frame having a loading area; a frame-supported track to guide a corrugated filter-medium support through the loading area; and a roll of filtering material removably supported on the frame in position to be fed over the face of a corrugated filter-medium support passing through the loading area.

The frame is composed of a horizontally arranged, downwardly facing, channel-shaped base member 1, and a pair of vertically arranged laterally spaced inwardly facing channel-shaped side members 2 at opposite ends of the base 1, all of these parts being welded or otherwise rigidly secured together. If desired, the frame may be re-enforced by arranging a plate 3 horizontally between, and securing its opposite ends to, the side walls 2 intermediate their upper and lower ends.

The frame-supported track comprises a pair of laterally spaced angle-iron members 4 resting on the bottom plate 1, between and in generally parallel relation to the side walls, each track member being inwardly spaced from the adjacent side wall. Each track member 4 carries, on its inner vertical face but spaced below its upper edge, a horizontally extending inwardly facing channel member 5. The top surface of the channel member 5 and the adjacent upwardly extending surface of the angle-iron 4 respectively provide a support and guide for a corrugated filter medium support during its travel through the loading area. To add to the rigidity of the frame and the track, a pair of L-shaped brackets 6 may be secured to the outer vertical face of each angle iron member 4 at opposite sides of the bottom plate 1. Each bracket 6 extends horizontally inward, from the lower end of the corresponding side wall 2, along one side of the bottom plate 1 to the angle-iron track member 4 and thence horizontally outward, from the bottom plate 1, along the member 4 for a suitable distance. It is welded or otherwise rigidly secured to all connecting parts.

The filter medium support F, whose corrugated face is to be covered by a conforming sheet of filtering material, will, of course, be arranged on and moved along the track with its corrugated face uppermost and with the crests and valleys of its corrugations extending sequentially in the line of motion. A roll of filtering material 7 may be removably supported on the frame in the usual way; hence the upper ends of the side-wall members 2 are notched at 8, adjacent the rear of the loader, to receive the roll supporting member 9. To facilitate the feed of material from the roll 7 to the support F around the front edge of the re-enforcing plate 3, the front marginal portion of the plate 3 may be inclined upwardly and rearwardly as at 3a.

In accordance with the present invention, the loader additionally includes novel means for conforming the filter medium to successive valleys of the corrugated filter medium support as it moves through the loading area, means for moving the support through the loading area, and independent means for holding the medium in conformation with one valley while the medium is being conformed to the next valley.

The conforming means includes one or more blade-like elements 10, two being shown, arranged for movement along a prescribed path extending downwardly into, and upwardly out of, the loading area sufficiently to cause the elements to press the interposed portion of the filter medium 7 downwardly into full conformation with one valley and thence to pass upwardly entirely out of the valley. Each conforming element 10 has its upper edge bent to form a loop. It is pivotally mounted upon an endless upright conveyor, which prescribes the path of movement and carries the elements along such path, by means of pintles 11 which are mounted on the conveyor to extend into opposite ends of the loop on the element 10.

The conveyor comprises a pair of laterally spaced endless conveyor chains 12, one adjacent each side wall 2, each chain carrying one pintle 11 for each element 10. Each chain encircles an upper idling sprocket 13 and a lower drive sprocket 14. Each idling sprocket is rotationally supported on the adjacent side wall by individual stub shafts 13a while the lower drive sprockets are similarly supported by a common drive shaft 14a which projects through one wall to receive a suitable crank handle or other driving connection. One of the lower drive sprockets 14 is provided with a pawl 15, pivotally mounted on the adjacent side wall 2, to permit rotation in one direction such as to make the front side of the conveyor the upside thereof, and prevent rotation in the opposite direction.

The filter medium support F may be manually shoved through the loading area or any other suitable means may be employed for effecting its movement therethrough. However, to perform this function, the conveyor may conveniently be, and preferably is extended downwardly to bring the upper loop of the elements 10 into engagement with the support F throughout a forward travel of the loop approximating the pitch of the corrugations of the support. With this arrangement, when a valley of the support is positioned to receive a conforming element, the upper loops of the element, in traveling around the lower sprocket 14, will engage and move the support forward sufficiently to place the next valley of the support in position to receive the next conforming element.

The holding means simply comprises a suitable number of resilient rollers 16, four being shown, idly mounted on the drive shaft 14a to rotate independently thereof and dimensioned to engage the crests of the support F successively as they pass under the rollers. These rollers operate to clamp the filter medium against a crest during the interval the medium is being conformed to the valley immediately following such crest. The rollers may be held in spaced relation along the drive shaft by suitable cotter pins (not shown) passing through the shaft on each side of each roller.

With material from the roll passing downwardly around the underside of the clamping rollers 16 and with the first crest of the support positioned under the rollers 16 so that the filter medium is clamped thereon by the rollers, the operation of the loader can be instituted simply by turning the drive shaft 14a to rotate the conveyor. As the conveyor moves, a conforming element 10 will pass downwardly, along the downside of the conveyor into engagement with the filter medium, and press it into conformation with the valley immediately following the first crest. During the latter phase of this operation, the upper loop of the element will engage the support F immediately behind the first crest and, through such engagement, move the support forward as the loop moves around the lower sprockets. The completion of this forward movement brings the second crest of the support F in clamping relation underneath the roller 16 and the second valley in conforming relation underneath the downside of the conveyor. With continued movement of the conveyor, the first conforming element 10 is carried upwardly out of the first valley while the other conforming element 10 is carried downwardly into the second valley, the conforming, moving and clamping actions being repeated with each half turn of the conveyor.

Since the pivotally mounted blade-like conforming elements 10 are likely to swing about the rod 11, during the interval in which they are disengaged from the support F, it is desirable to limit their swinging action in order to prevent a descending blade from swinging over and catching on the clamping rollers 16. Accordingly, swing-limiting means are provided to engage a blade as it rises, move with it until it descends a suitable distance, and then return to its initial blade-rising position. Such means comprises an arm 17, pivotally mounted on one side wall for movement between blade-rising and descending positions and a spring 18 resiliently urging the arm to its blade rising position. The outer end of the arm is fashioned to form an inverted U-shaped recess or saddle 17a, which in the blade rising position extends directly in the path of the rising blade. Consequently, the blade, in rising, enters the saddle. As the blade crosses over from the upside of the conveyor to the downside thereof, it swings the arm 17 horizontally from the rising position to the descending position, and, in the latter position, moves downwardly out of the saddle, whereupon the spring 18 becomes effective to return the arm to the rising position. So long as the saddle straddles the blade, it cannot swing to an improper position; hence, upon descending, it is properly directed into a valley.

Having described my invention, I claim:

1. An improvement in air-filter loaders of the type composed of a frame having a loading area through which a corrugated filter-medium support passes with its crests and valleys extending sequentially in the line of motion, comprising: a carrier movably mounted on said frame; a blade-like element pivotally depending from said carrier in free swinging relation thereto; means for moving said carrier to direct said element downwardly into and upwardly out of a valley in said loading area for pressing an interposed filter medium into conformation with said valley; and means for directing the lower end of said element as it moves downwardly into a valley.

2. The loader defined in claim 1 wherein: said directing means functions to restrict the free swinging movement of said element during its downward approach to a valley.

3. An improvement in air-filter loaders of the type composed of a frame having a loading area through which a corrugated filter-medium support passes with its crests and valleys extending sequentially in the line of motion, comprising: an endless upright carrier movably mounted on said frame; a blade-like element pivotally depending from said carrier in free swinging relation thereto; means for moving said carrier to direct said element along an endless path extending downwardly into and upwardly out of a valley in said loading area for pressing an interposed filter medium into conformation with said valley; and means for limiting the swinging of said element after it leaves one valley and as it approaches another.

4. An improvement in air-filter loaders of the type composed of a frame having a loading area through which a corrugated filter-medium support passes with its crests and valleys extending sequentially in the line of motion, comprising: a carrier movably mounted on said frame; a blade-like element pivotally connected to depend from said carrier about an axis adjacent its upper end; means for moving said carrier to direct said depending element downwardly into and upwardly out of a valley in said loading area for pressing an interposed filter medium into conformation with said valley, said axis passing downwardly into and upwardly out of the upper portion of said valley; an upper end portion of said element being operative to engage said support, during the movement of its axis below said crest, and move the support to position another valley thereof in the loading area.

5. An improvement in air-filter loaders of the type composed of a frame having a loading area— through which a corrugated filter-medium support passes with its crests and valleys extending sequentially in the line of motion—and conforming means for pressing a filter medium into conformation with a valley in the loading area, comprising: holding means on the frame for clamping the filter medium on a crest while the conforming means presses the medium into conformation with the following valley.

6. The loader defined in claim 5 wherein: the holding means comprises at least one member mounted on the frame to engage said crest resiliently.

7. The loader defined in claim 5 wherein: the holding means comprises at least one idling resilient roller rotationally mounted on the frame to engage said crest.

8. An air filter loader comprising: a frame having a loading area through which a corrugated filter-medium support passes with its crests and valleys extending sequentially in the line of motion; a shaft mounted on said frame to extend across the line of motion slightly above the crests of said support; a pair of lower sprockets on said shaft at opposite sides of said loading area; a pair of upper sprockets mounted on said frame above said lower sprockets; a conveyor chain encircling each pair of sprockets; a blade-like element pivotally connected, about an axis adjacent its upper end, to depend from said chains; means for moving said chains to direct said depending element downwardly into and upwardly out of a valley in said loading area for pressing an interposed filter medium into conformation with said valley, the upper end portion of said element passing downwardly into and upwardly out of the upper portion of said valley during the conforming operation and, in doing so, being operative to engage and move said support to position another valley thereof in the loading area; and resilient rollers mounted on said shaft to clamp the filter medium on a crest during the conforming operation in the valley following said crest.

9. An improvement in air-filter loaders of the type composed of a frame having a loading area through which a corrugated filter-medium support passes with its crests and valleys extending sequentially in the line of motion, comprising: a carrier movably mounted on said frame; a blade-like element depending from said carrier; and means for moving said carrier to direct said element downwardly into and upwardly out of a valley in said loading area for pressing an interposed filter medium into conformation with said valley; said element being pivotally connected to said carrier about an axis which extends below the crest of said support during the conforming operation, a portion of said element, adjacent said axis, being operative to engage said support, during the movement of its axis below said crest, and move the support to position another valley thereof in the loading area.

VERNER DAHLMAN.